US012473489B2

(12) United States Patent
Ouspenski et al.

(10) Patent No.: US 12,473,489 B2
(45) Date of Patent: Nov. 18, 2025

(54) SCINTILLATOR MATERIAL COMPRISING A DOPED HALIDE PEROVSKITE

(71) Applicants: SAINT-GOBAIN CRISTAUX ET DETECTEURS, Courbevoie (FR); CENTRE NATIONALE DE LA RECHERCHE SCIENTIFIQUE, Paris (FR); ECOLE NATIONALE SUPERIEURE DE CHIMIE DE PARIS, Paris (FR)

(72) Inventors: Vladimir Ouspenski, Saint-Pierre-lès-Nemours (FR); Thierry Pauporte, Vincennes (FR); Bruno Viana, Montgeron (FR)

(73) Assignees: Luxium Solutions, LLC, Hiram, OH (US); Centre National de la Recherche Scientifique, Paris (FR); Ecole Nationale Superieure de Chimie de Paris, Paris (FR)

( * ) Notice: Subject to any disclaimer, the term of this patent is extended or adjusted under 35 U.S.C. 154(b) by 295 days.

(21) Appl. No.: 18/245,228

(22) PCT Filed: Sep. 14, 2021

(86) PCT No.: PCT/FR2021/051575
§ 371 (c)(1),
(2) Date: Mar. 14, 2023

(87) PCT Pub. No.: WO2022/058677
PCT Pub. Date: Mar. 24, 2022

(65) Prior Publication Data

US 2023/0365858 A1 Nov. 16, 2023

(30) Foreign Application Priority Data

Sep. 15, 2020 (FR) ....................................... 2009338

(51) Int. Cl.
*H01L 27/146* (2006.01)
*C09K 11/06* (2006.01)
*G01T 1/202* (2006.01)

(52) U.S. Cl.
CPC ............ *C09K 11/06* (2013.01); *G01T 1/2023* (2013.01)

(58) Field of Classification Search
None
See application file for complete search history.

(56) References Cited

U.S. PATENT DOCUMENTS

2018/0321393 A1* 11/2018 Wu ...................... C01G 25/006
2020/0209414 A1* 7/2020 Birowosuto .............. G01T 1/20
2020/0255724 A1* 8/2020 Mohammed ......... C09K 11/025
2020/0379131 A1* 12/2020 Saliba ................... G01T 1/2985
2023/0350083 A1* 11/2023 Schutt ................... G01T 1/2018

FOREIGN PATENT DOCUMENTS

JP 2002-277553 A 9/2002
JP 2003036977 A 2/2003
JP 2017536698 A 12/2017
JP 2018-529830 A 10/2018
JP 2019526782 A 9/2019
WO 2022/058677 A1 3/2022

OTHER PUBLICATIONS

International Search Report from PCT/FR2021/051575 dated Dec. 9, 2021, 5 pgs.
Zhang Ruiling et al: "Bismuth doped lead-free two-dimensional tin based halide perovskite single crystals," Journal of Energy Chemistry. Elsevier. Amsterdam. NL. vol. 36. Dec. 10, 2018 (Dec. 10, 2018). pp. 1-6. XP085824586.
Lyu Feiyi et al: "Bi 3+ doped 2D Ruddlesden-Popper organic lead halide perovskites," Journal of Materials Chemistry A., vol. 7. No. 26. Jun. 13, 2019 (Jun. 13, 2019), pp. 15627-15632. XP055802625.
Gencai Pan et al: "Doping Lanthanide into Perovskite Nanocrystals: Highly Improvedand Expanded Optical Properties," Nano Lett, vol. 17. No. 12, Nov. 28, 2017 (Nov. 28, 2017). pp. 8005-8011. XP002792764.
M. D. Bi Rowosuto et al: "X-ray Scintillation in Lead Halide Perovskite Crystals," Scientific Reports, vo 1 • 6. No. 1, Nov. 16, 2016 (Nov. 16, 2016). XP055663768. Reference not available, cited in ISR.
Birowosuto, M.D., et al., "X-ray Scintillation in Lead Halide Perovskite Crystals," Scientific Reports 6, Article No. 37254, Year: 2016, 28 pages.

* cited by examiner

*Primary Examiner* — Marcus H Taningco
(74) *Attorney, Agent, or Firm* — Abel Schillinger, LLP; John M. Frank

(57) ABSTRACT

A scintillator material for an ionizing radiation detector comprising a halide perovskite, said perovskite having one of the following formulations:

$(A')_2(A)_{n-1}[M_nX_{3n+1}]$ with n a positive integer between 1 and 100, inclusive, or $(A')(A)_{p-1}[M_pX_{3p+1}]$ with p a positive integer between 1 and 100, inclusive, or $(A')_2(A)_m[M_mX_{3m+2}]$, with m a positive integer between 1 and 100, inclusive, or $(A')_2(A)_{q-1}[M_qX_{3q+3}]$, with q a positive integer between 1 and 100, inclusive;

where A and A' are organic cations, M is a metal chosen from Pb, Bi, Ge or Sn, X is a halogen or a mixture of halogens chosen from Cl, Br, and I, and wherein said perovskite further comprises at least one scintillation activating element N.

16 Claims, No Drawings

SCINTILLATOR MATERIAL COMPRISING A DOPED HALIDE PEROVSKITE

CROSS-REFERENCE TO RELATED APPLICATIONS

This application is a National Stage entry under 35 U.S.C. § 371 of International Application No. PCT/FR2021/051575, filed Sep. 14, 2021, entitled "SCINTILLATOR MATERIAL COMPRISING A DOPED HALIDE PEROVSKITE," by Vladimir OUSPENSKI et al., which claims priority to French Patent Application No. 2009338, filed Sep. 15, 2020, entitled "MATERIAU SCINTILLATEUR COMPRENANT UNE PEROVSKITE D'HALOGENURE DOPEE," by Vladimir OUSPENSKI et al., of which both applications are assigned to the current assignees hereof and incorporated herein by reference in their entireties.

The invention relates to the field of scintillators which can be fitted to detectors of ionizing radiation such as X-rays and gamma rays and ionizing particles.

Ionizing radiation (which includes ionizing particles such as protons, neutrons, electrons, muons, alpha particles, ions, and X- or gamma rays) is usually detected using single crystal scintillators converting incident radiation into light, which is then transformed into an electrical signal using a photodetector such as a photomultiplier. An essential parameter for choosing the scintillator material is the scintillation yield, which corresponds to the number of photons per unit of energy of the ionizing radiation absorbed. The most common unit used to measure yield is the number of photons emitted per MeV of incident energy.

Amorphous materials have defects in the structures which cause trapping of charge carriers during scattering such as electrons, holes and excitons responsible for energy transfer in the scintillation mechanism. The inorganic scintillators usually used are for this reason crystalline, and very often monocrystalline. To effectively detect ionizing radiation, they are preferably of relatively large size, that is to say of volume greater than 1 $cm^3$ in order to increase the probability of collision between high energy particles and the scintillator material.

The scintillators used may in particular be single crystals of sodium iodide doped with thallium, cesium iodides doped with thallium or sodium, and lanthanum halides doped with cerium or praseodymium. Crystals based on lanthanum halide have been the subject of work published in particular under U.S. Pat. Nos. 7,067,815, 7,067,816, US2005/188914, US2006/104880, US2007/241284.

More recently, in the scientific publication "Scintillation Properties of a Crystal of $(C_6H_5(CH_2)_{(2)}NH_3)_{(2)}PbBr_4$", IEEE, New York (2009), an organic-inorganic scintillator crystal based on lead halide and having the perovskite structure has been proposed. The scintillation, measured under a gamma energy of 662 keV, and the luminescence properties were studied on single crystals of dimensions 5×6×1 $mm^3$. The scintillation light yield was measured at values of the order of 10,000 photons per MeV under low temperature conditions (liquid nitrogen).

As a detector, lead halide perovskites have shown benefit in detecting ionizing radiation, due to their high stopping power, fault tolerance, high mobility and short lifetime, and their tunable bandwidth. In addition, it is possible to obtain them by simple growth of single crystals resulting from conventional and inexpensive solution processes.

In the publication "Halide lead perovskites for ionizing radiation detection," Nature Communications, 10, 12 (2019), it is stated that the potential light yield of these perovskite single crystals could be estimated as between 120,000 and 270,000 photons/MeV due to the relatively small band gap width of these materials (which may be less than 2 eV).

More generally, halogen-based perovskites can be of different types: a distinction is thus made between three-dimensional (or 3D) perovskites, two-dimensional (or 2D) perovskites and intermediate-dimensional (2D/3D) perovskites.

In a classical three-dimensional structure of general formula $ABX_3$, the halogen anions form octahedra linked by their vertices to form said three-dimensional structure, wherein the cation B of an element such as lead is present in the middle of the octahedron and the larger cation A, typically an organic cation, is present between the octahedra.

Such materials having a 3D perovskite structure are for example the compounds of general formula $MAPbX_3$ where MA is methylammonium, Pb is lead and X is a halogen such as I, Br or Cl.

Alternatively, the material can have a crystalline structure which this time is 2D or homologous (related), known as two-dimensional, that is to say that the crystalline structure is characterized by an alternation of n layers of octahedra of the perovskite type linked by the vertices and separated by a layer of the organic cation A forming a plane separating the octahedra. More precisely, we speak of a 2D structure when n=1 and of a homologous or related 2D structure for n>1. The present invention relates to such 2D or homologous structures.

A schematic representation of these two possible arrangements is notably described in the publication "Ruddlesden-Popper Hybrid Lead Iodide Perovskite 2D Homologous Semiconductors" Chem Mater. 2016 or in the publication "X-ray Scintillation in Lead Halide Perovskite Crystals," Scientific Reports, 6, 10 (2016).

This latter publication also discusses the characteristics of X-ray scintillators of three-dimensional (3D) crystals of $MAPbI_3$ and $MAPbBr_3$ (MA being methylammonium) and two-dimensional (2D) crystals of perovskite $(EDBE)PbCl_4$ (EDBE is 2,2'-ethylenedioxy)bis(ethylammonium). It is reported in this latter publication that the large binding energy of excitons in the 2D material significantly reduces thermal effects compared with 3D perovskites, and that a limited light yield of 9,000 photons/MeV could, however, be obtained, even at room temperature.

The object of the present invention is to provide new scintillator materials, in particular of so-called 2D or homologous structures, useful in particular in the fields of the detection of ionizing radiation such as X-rays, gamma rays, and neutrons, the synthesis of which is simple and inexpensive.

More specifically, the invention relates to a scintillator material for a detector of ionizing radiation comprising and preferably consisting of a halide perovskite, wherein said perovskite corresponds to one of the following formulations:

- $(A')_2(A)_{n-1}[M_nX_{3n+1}]$, where n is a positive integer between 1 and 100, inclusive, preferably between 1 and 10, inclusive, and very preferably between 1 and 4, inclusive, or
- $(A')(A)_{p-1}[M_pX_{3p+1}]$, where p is a positive integer between 1 and 100, inclusive, preferably between 1 and 10, inclusive, and very preferably between 1 and 4, inclusive, or
- $(A')_2(A)_m\ [M_mX_{3m+2}]$, where m is a positive integer between 1 and 100, inclusive, preferably between 1 and 10, inclusive, and very preferably between 1 and 4, inclusive, or $(A')_2(A)_{q-1}[M_qX_{3q+3}]$, where q is a positive integer between 1 and 100, inclusive, preferably between 1 and 10, inclusive, and very preferably between 1 and 4, inclusive;

where A and A' are organic cations, M is a metal preferably chosen from Pb, Bi, Ge and Sn, X is a halogen or a mixture of halogens chosen from CI, Br, and I, and in which said perovskite further comprises at least one scintillation activating element N (different from M).

According to preferred modes of the invention, which can of course be combined with each other if necessary:

- Said halide perovskite corresponds to the formulation $(A')_2(A)_{n-1}[M_nX_{3n+1}]$, wherein n is more preferably equal to 1 or 2, or even equal to 1.
- Said halide perovskite corresponds to the formulation $(A')(A)_{p-1}[M_pX_{3p+1}]$, (so-called Dion-Jacobson perovskite), wherein A' is preferably the 3-(aminomethyl) piperidinium (or 3AMP) or 4-(aminomethyl)piperidinium (or 4AMP) and A is preferably methylammonium (MA) p being more preferably equal to 1 or 2, or even equal to 1.
- Said halide perovskite corresponds to the formulation $(A')_2(A)_{q-1}$ $[M_qX_{3q+3}]$, q being more preferably equal to 1 or 2, or even equal to 1.
- Said halide perovskite corresponds to the formulation $(A')_2(A)_m$ $[M_mX_{3m+2}]$, m being more preferably equal to 1 or 2, or even equal to 1.
- Said activating element N is chosen from Sb, Bi, Pb, In and rare-earth elements.
- Said activating element N is chosen from Bi, Eu, Sm, Tb, and Yb.
- Said activating element N is chosen from organic molecules exhibiting fluorescence properties in scintillators, in particular 1,4-bis(5-phenyloxazol-2-yl) benzene (POPOP).
- Said material also comprises a neutron absorber chosen from isotopes enriched with lithium-6 or boron-10.
- Said perovskite has the formulation $(A)_2(A)_{n-1}[M_nX_{3n+1}]$, n is a positive integer between 1 and 100, inclusive, preferably between 1 and 10, inclusive, and very preferably between 1 and 4, inclusive.
- Said perovskite has the formulation $A_2[MX_4]$, wherein M is preferably selected from Pb, Ge or Sn.
- The proportion of the activating element, on an atomic basis, is of the order of $1.0*10^{-4}<N/M<0.1$, preferably $1.0*10^{-3}<N/M<0.05$, and more preferably $1.0*10^{-2}<N/M<1.0*10^{-1}$.
- The organic cation(s) A and/or A' are chosen from alkyl ammoniums R—$NH_3$, in particular methylammonium, formamidinium, butylammonium, phenylammonium, phenylethylammonium, 5-aminovaleric acid, benzylammonium, 3-(aminomethyl)piperidinium or 4-(aminomethyl)piperidinium.
- The element M comprises Pb and more preferably is Pb.
- The scintillation activating element comprises Bi and more preferably is Bi.
- The M element comprises Bi and more preferably is Bi and the scintillation activating element comprises Pb and more preferably is Pb.
- The element X comprises CI and more preferably is Cl.
- The element X is a mixture of at least two halogens chosen from CI, Br and I.
- The material comprises two activating elements, one of which has a valence +I and the other a valence +III, in particular an element chosen from K, Na, Li, Cs, Rb, Ag, Au or Cu and an element chosen from Bi, In, Sb, and the rare earths, in particular chosen from Eu, Sm, Tb, and Yb.
- Said material is monocrystalline.

The invention also relates to a scintillating detector of ionizing radiation comprising the material as described above.

The scintillating detector notably comprises a photodetector sensitive to a wavelength ranging from 300 nm to 800 nm.

The scintillator material according to the invention can be polycrystalline but is preferably monocrystalline.

A single crystal according to the invention can be obtained very simply and inexpensively by a monocrystalline growth process well known to those skilled in the art under the name STL (slow temperature lowering), as described, for example, in the publication cited above or again in the publication “Modulation in hybrid metal halide perovskites”, Adv Mater. 2018; 30 (51). This method is based on the solubility properties of the solution of a precursor of the material in an aqueous solution (typically a halide of element A). The growth of the crystal is obtained by cooling, the solvency of the precursor decreasing with the temperature.

Other methods of crystal growth are obviously also possible according to the invention, such as the techniques known as “Anti-Solvent Vapor assisted method” or “Inverse Temperature Crystallization” according to the English terms usually used.

The invention and its advantages will be better understood on reading the following examples according to the invention and comparisons:

EXAMPLE 1 (INVENTION)

In this example, a two-dimensional (or 2D) halogen-based perovskite was synthesized. More precisely, the form $BA_2PbCl_4$ (BA=benzylammonium) further comprising bismuth was synthesized by proceeding as follows:

The crystals were grown in a flask immersed in a thermostatic oil bath. The initial chemical reagents are $PbCl_2$ from Alfa Aesar 99.999%, benzylammonium chloride (BACl) (>98%) from TCI and $BiI_3$ 99.999% from Alfa Aesar.

The compounds are weighed to prepare 10 mL of a 0.1 M $PbCl_2$ precursor solution. The BACl:$PbCl_2$ ratio was 2:1. The precursors were dissolved in 10 mL of 37% hydrochloric acid (HCl). Then 3% molar $BiI_3$ was added. The flask containing 5 mL of solution is placed in a silicone oil bath heated by a heating plate so that the solution is 100% immersed in the oil and kept under stirring overnight at 50° C. (FIG. 1). The temperature is then increased to 100° C. After a stabilization time of 30 minutes, the temperature is reduced very slowly (5° C./30 min). Each decrease of 5° C. (10 min) is followed by a 20-min stabilization time. The temperature is reduced in this way until it reaches room temperature. The crystals are then dried with paper at 50° C. on the hot plate. The crystals obtained are in the form of plates with a length of 1.5 mm for a thickness of 0.2 to 0.3 mm.

EXAMPLE 2 (COMPARATIVE)

In this example, the procedure was the same as that for example 1 according to the invention, but the element bismuth was not introduced into the composition of the crystal.

EXAMPLE 3 (COMPARATIVE)

In this example, a three-dimensional (or 3D) halogen-based perovskite was synthesized. More precisely, the form $MAPbCl_3$ (MA=methyl ammonium) was synthesized by proceeding as follows:

The reagents used are $PbCl_2$ 99.999%, from the company Alfa Aesar and MACI (methyl ammonium chloride) 99.999%, also from Alfa Aesar. A solution of 1 mL precursors of 1 M concentration of $PbCl_2$ is prepared. The solvent used has a 1:1 ratio of DMF and dimethyl sulfoxide (DMSO). 0.5 mL of each of the reagents is added using a micropipette to a bottle containing the solvent. The bottle is placed in a silicone oil bath heated by a hot plate, the solution being 100% immersed in the oil, and kept stirred overnight at 50° C. The solution is filtered with a 0.45 μm filter, the stoppered bottle is placed in the oil bath so that the liquid/gas interface corresponds to the oil level. The temperature is increased to 70° C. for crystallization to occur. After an hour, a dozen transparent crystals appeared at the bottom of the solution. Three crystals are left in the solution and the others are removed. After 6 more hours the three crystals have reached a size of about 2 mm in length by 1 mm in thickness.

Analysis and Results:

The crystals obtained according to examples 1 to 3 are analyzed by the following techniques:

A. UV Spectroscopy

The crystals were placed in a vacuum chamber cooled to 14 K and subjected to UV excitation by an LED device emitting 365 nm radiation. Emission spectra were recorded at 14 K and at room temperature. The position of the maximum of the emission peak is shown in Table 1 below, as well as the emission color observed.

B. Radioluminescence Under Excitation X

As stated earlier, scintillation is the capacity of a compound to become excited under incident excitation (such as X-rays) and return energy as photons in the visible range. Indeed, a central electron first enters an excited state in reaction to a high energy photon (of the order of keV or GeV) and, after several steps, several electrons can become de-excited in the valence band, thus releasing several visible photons.

In order to verify the scintillation of the crystals according to examples 1 to 3 above, an X-ray generator was used to irradiate them. Voltage and current were set for each experiment at 40 keV and 25 mA. The samples are placed in a cryostat under vacuum, at temperatures of 14 K and at room temperature.

The radioluminescence spectra are recorded using a photodetector placed in the cryostat and the presence of a scintillation peak (photopeak) is observed. The results obtained at 14 K and at room temperature are shown in Table 1 below.

C. Pulse Height Spectrum

A pulse height analyzer was used to measure the scintillation performance of the crystals under gamma radiation. Such an instrument records electronic pulses of different heights from particle and event detectors, digitizes the pulse heights, and records the number of pulses of each height in registers or channels, thus recording an "impulse height spectrum".

Scintillation intensity was recorded at room temperature in a glove box using a gamma source of $^{137}Cs$ at 662 keV. A windowless Photonix APD avalanche photodiode (model 630-70-72-510) under 1600 V voltage and cooled to 250 K was used as the photodetector. The output signal was amplified with shaping time conditions of 6 μs by an ORTEC 672 spectroscopic amplifier. In order to maximize light collection, the samples were covered with Teflon powder and then compressed (according to the technique described in J. T. M. de Haas and P. Dorenbos, IEEE Trans. Nucl. Sci. 55, 1086 (2008)), apart from the cleaved side intended for coupling with the photodiode. Exposed to a high energy source, the crystal produces photons that are detected by a photomultiplier, regardless of the wavelength of the photon. The detector used is sensitive from UV to IR and allows each photon to be counted. In this way, a scintillation histogram is obtained, with values proportional to the quantity of emitted light detected by the optical device (measured with a $^{137}Cs$ isotopic source with an Advanced Photonix APD 630-70-72-510 detector, said detector being at a temperature of 270 K) on the abscissa, and the numbers of gamma photon interaction events with the scintillator on the ordinate. According to this experiment, the more the scintillation peak is observed with a high number of channels, the higher the number of photons emitted per pulse.

In addition, the presence of such a photopeak makes it possible notably to determine in particular whether the observed scintillation effect can be associated with a sufficient energy resolution to allow a possible discrimination of the energies of different isotopes.

All the results obtained for the analyses A to C carried out on the crystals of examples 1 to 3 are collated in Table 1 below.

TABLE 1

| Example | 1 (invention) | 2 (comparison) | 3 (comparison) |
| --- | --- | --- | --- |
| Matrix | $(BA)_2PbCl_4$ | $(BA)_2PbCl_4$ | $(MA)PbCl_3$ |
| [Bi] (mol %) | 3 | — | — |
| □$_{max\ emission}$ (nm) UV excitation (14 K) | 540-580 (green) | 433 (green-yellow) | 400 (UV) |
| Luminescence under UV excitation (T = 298 K) | yes | No emission | No emission |
| □$_{Scintillation}$ under X excitation (T = 14 K) | 530-550 nm | 539 nm | 400 nm |
| Scintillation under X excitation (T = 298 K) | Yes | Yes (low) | No |
| Luminescence under □ ($^{137}Cs$ at 662 keV) Number of channels (T = 298 K) | 400 | 350 | 90 |

TABLE 1-continued

| Example | 1 (invention) | 2 (comparison) | 3 (comparison) |
|---|---|---|---|
| Presence of a photopeak under □ (Cs137) (T = 298 K) | Yes | No | No |

The improved scintillation properties of the crystal according to example 1 according to the invention are visible in the data shown in Table 1. Data representative of scintillation under X excitation or under □ excitation thus appear significantly improved compared with the comparison materials.

The invention claimed is:

1. A scintillator material for an ionizing radiation detector comprising a halide perovskite, said perovskite having one of the following formulations:

$(A')_2(A)_{n-1}[M_nX_{3n+1}]$ with n a positive integer between 1 and 100, inclusive, or $(A')(A)_{p-1}[M_pX_{3p+1}]$ with p a positive integer between 1 and 100, inclusive, or $(A')_2(A)_m[M_mX_{3m+2}]$, with m a positive integer between 1 and 100, inclusive, or $(A')_2(A)_{q-1}[M_qX_{3q+3}]$, with q a positive integer between 1 and 100, inclusive;

where A and A' are organic cations, M is a metal chosen from Pb, Bi, Ge or Sn, X is a halogen or a mixture of halogens chosen from Cl, Br, or I, and wherein said perovskite further comprises at least one N scintillation activating element; and a neutron absorber chosen from isotopes enriched with lithium-6 or boron-10.

2. The scintillator material of claim 1, wherein said activating element N is chosen from Sb, Bi, Pb, In and the rare-earth elements.

3. The scintillator material of claim 1, wherein said activating element N is chosen from Bi, Eu, Sm, Tb, and Yb.

4. A scintillator material for an ionizing radiation detector comprising a halide perovskite, said perovskite having one of the following formulations:

$(A')_2(A)_{n-1}[M_nX_{3n+1}]$ with n a positive integer between 1 and 100, inclusive, or $(A')(A)_{p-1}[M_pX_{3p+1}]$ with p a positive integer between 1 and 100, inclusive, or $(A')_2(A)_m[M_mX_{3m+2}]$, with m a positive integer between 1 and 100, inclusive, or $(A')_2(A)_{q-1}[M_qX_{3q+3}]$, with q a positive integer between 1 and 100, inclusive; where A and A' are organic cations, M is a metal chosen from Pb, Bi, Ge or Sn, X is a halogen or a mixture of halogens chosen from Cl, Br, and I, and wherein said perovskite further comprises at least one N scintillation activating element, wherein said activating element N is chosen from organic molecules exhibiting fluorescence properties in scintillators, in particular 1,4-bis(5-phenyloxazol-2-yl) benzene (POPOP).

5. The scintillator material of claim 1, wherein said perovskite has the formulation $A_2[MX_4]$, wherein M is preferably selected from Pb, Ge or Sn.

6. The scintillator material of claim 1, wherein the proportion of the activating element, on an atomic basis, is of the order of $1.0*10^{-4}<N/M<0.1$.

7. The scintillator material of claim 1, wherein the organic cation(s) A and/or A' are chosen from alkyl-ammoniums $R\text{-}NH_3$, in particular methylammonium, formamidinium, butylammonium, phenylammonium, phenylethylammonium, 5-aminovaleric acid, benzylammonium, 3-(aminomethyl)piperidinium, or 4-(aminomethyl)piperidinium.

8. The scintillator material of claim 1, wherein the element M comprises Pb and preferably is Pb.

9. The scintillator material of claim 1, wherein the scintillation activating element comprises Bi.

10. The scintillator material of claim 1, wherein the element M comprises Bi and wherein the scintillation activating element comprises Pb.

11. The scintillator material of claim 1, wherein the element X comprises Cl.

12. The scintillator material of claim 1, wherein the element X is a mixture of at least two halogens chosen from Cl, Br and I.

13. The scintillator material of claim 1, comprising two activating elements, one of which has a valence +I and the other a valence +III, in particular an element chosen from K, Na, Li, Cs, Rb, Ag, Au or Cu and an element chosen from Bi, In, Sb, and the rare earths, in particular chosen from Eu, Sm, Tb, and Yb.

14. The scintillator material of claim 1, characterized in that it is monocrystalline.

15. A Scintillator detector of ionizing radiation comprising the material of claim 1.

16. The scintillating detector of claim 15, further comprising a photodetector sensitive to a wavelength ranging from 300 nm to 800 nm.

* * * * *